United States Patent
Büchner et al.

(10) Patent No.: US 9,321,939 B2
(45) Date of Patent: Apr. 26, 2016

(54) METHOD FOR THE PRODUCTION OF ADHESIVE-COATED ARTICLES, ARTICLES OBTAINABLE THEREBY AND THEIR USE

(75) Inventors: Jörg Büchner, Bergisch Gladbach (DE); Harald Kraus, Leverkusen (DE); Pantea Nazaran, Köln (DE); Matthias Wintermantel, Bergisch Gladbach (DE)

(73) Assignee: Covestro Deutschland AG, Leverkusen (DE)

( * ) Notice: Subject to any disclaimer, the term of this patent is extended or adjusted under 35 U.S.C. 154(b) by 194 days.

(21) Appl. No.: 13/823,335

(22) PCT Filed: Sep. 14, 2011

(86) PCT No.: PCT/EP2011/065927
§ 371 (c)(1),
(2), (4) Date: May 8, 2013

(87) PCT Pub. No.: WO2012/035059
PCT Pub. Date: Mar. 22, 2012

(65) Prior Publication Data
US 2013/0220543 A1      Aug. 29, 2013

(30) Foreign Application Priority Data
Sep. 17, 2010    (EP) .................................... 10177381

(51) Int. Cl.
| | | |
|---|---|---|
| C09J 7/02 | (2006.01) | |
| C08G 18/08 | (2006.01) | |
| C08G 18/10 | (2006.01) | |
| C08G 18/12 | (2006.01) | |
| C08G 18/42 | (2006.01) | |
| C08G 18/72 | (2006.01) | |
| C09J 175/06 | (2006.01) | |
| C08L 33/02 | (2006.01) | |
| C08L 33/08 | (2006.01) | |
| C08L 75/04 | (2006.01) | |

(52) U.S. Cl.
CPC ........... *C09J 7/0225* (2013.01); *C08G 18/0814* (2013.01); *C08G 18/0828* (2013.01); *C08G 18/10* (2013.01); *C08G 18/12* (2013.01); *C08G 18/4202* (2013.01); *C08G 18/4238* (2013.01); *C08G 18/722* (2013.01); *C09J 7/0207* (2013.01); *C09J 175/06* (2013.01); *C08G 2170/80* (2013.01); *C08G 2250/00* (2013.01); *C08L 33/02* (2013.01); *C08L 33/08* (2013.01); *C08L 75/04* (2013.01); *C09J 2433/005* (2013.01); *Y10T 428/2843* (2015.01)

(58) Field of Classification Search
CPC ............................... C08L 75/04; C09J 7/0225
USPC ........................................ 156/331.7; 428/353
See application file for complete search history.

(56) References Cited

U.S. PATENT DOCUMENTS

2003/0162017 A1\* 8/2003 Weir et al. ...................... 428/354
2007/0141328 A1\* 6/2007 Kamiyama ................... 428/343

FOREIGN PATENT DOCUMENTS

| EP | 0741005 A1 | 11/1996 |
|---|---|---|
| EP | 1088871 A1 | 4/2001 |
| WO | WO-95/02621 A1 | 1/1995 |

OTHER PUBLICATIONS

International Search Report for PCT/EP2011/065927 mailed Nov. 16, 2011.

\* cited by examiner

*Primary Examiner* — Xiao Zhao
(74) *Attorney, Agent, or Firm* — Drinker Biddle & Reath LLP

(57) ABSTRACT

Method for the production of adhesive-coated articles, articles obtainable thereby and their use A method for the production of adhesive-coated articles comprises the steps of: (I) providing a substrate; (II) applying a first polyurethane and/or polyurethane-polyurea polymer onto the substrate, the first polyurethane and/or polyurethane-polyurea polymer being capable of attaining an at least partially crystalline state with a final degree of crystallinity and wherein during and/or after the application the first polyurethane and/or polyurethane-polyurea polymer is present in a non-crystalline state. The method further comprises the steps: (III) applying onto the first polyurethane and/or polyurethane-polyurea polymer of step (II) a composition comprising a mixture of a second polyurethane and/or polyurethane-polyurea polymer and furthermore an acrylate polymer, wherein the application is performed while the degree of crystallinity of the first polyurethane-polyurea polymer is lower than its final degree of crystallinity; and (IV) cooling the article obtained to a temperature below the glass transition temperature of the acrylate polymer.

13 Claims, No Drawings

METHOD FOR THE PRODUCTION OF ADHESIVE-COATED ARTICLES, ARTICLES OBTAINABLE THEREBY AND THEIR USE

RELATED APPLICATIONS

This application is a national stage application (under 35 U.S.C. §371) of PCT/EP2011/065927, filed Sep. 14, 2011, which claims benefit of European application 10177381.0, filed Sep. 17, 2010, incorporated herein by reference.

The present invention relates to a method for the production of adhesive-coated articles, wherein a first polymer is applied to a substrate, followed by the application of a polymer composition comprising two different polymers. The invention further concerns an article of manufacture, obtainable by a method according to invention and the use of such an article for the coating of an object.

Webs can be coated with an adhesive layer on one face. They may be applied to the web as an aqueous dispersion, a solvent-containing preparation or a hot melt.

For industrial applications the webs are employed as rolls (large rolls). Due to the permanent tackiness of the adhesive layer the rolls have to be protected against blocking by inserting a release paper (e.g. silicone paper). The use of a release paper or a release film leads to costs for the use of raw materials as well as additional costs for the disposal of the release paper or the release film.

If one were to contemplate not using a release paper, it should be considered that if a crystalline polyurethane polymer is applied to a web and subsequently dried or cooled, a certain time will elapse before the adhesive polymer has crystallized sufficiently to prevent blocking of individual layers in a roll. This, however, is in conflict with the goal of high production speeds.

Thus, the present invention has the object of providing such a method where no release paper or release liner is required to prevent the blocking of layers even if the webs after coating with an adhesive are wound on a roll after a comparatively short time following the coating, whereby the webs can be coated at a high production speed.

According to the present invention this object is achieved by a method for the production of adhesive-coated articles, comprising the steps of:
(I) providing a substrate;
(II) applying a first polyurethane and/or polyurethane-polyurea polymer onto the substrate,
   the first polyurethane and/or polyurethane-polyurea polymer being capable of attaining an at least partially crystalline state with a final degree of crystallinity,
   wherein during and/or after the application the first polyurethane and/or polyurethane-polyurea polymer is present in a non-crystalline state;
the method further comprising the steps:
(III) applying onto the first polyurethane and/or polyurethane-polyurea polymer of step (II) a composition comprising a mixture of a second polyurethane and/or polyurethane-polyurea polymer and furthermore an acrylate polymer,
   wherein the application is performed while the degree of crystallinity of the first polyurethane-polyurea polymer is lower than its final degree of crystallinity; and
(IV) cooling the article obtained to a temperature below the glass transition temperature of the acrylate polymer.

Preferably the first polyurethane and/or polyurethane-polyurea polymer and the second polyurethane and/or polyurethane-polyurea polymer have an identical composition.

Preferably the second polyurethane and/or polyurethane-polyurea polymer and the acrylate polymer used in step (III) posses the same hydrophilization, i.e. if the second polyurethane and/or polyurethane-polyurea polymer is cationically hydrophilized the acrylate polymer is cationically hydrophilized as well.

It has been found that articles coated using the method according to the invention may be coated and rolled rapidly and thus economically without blocking of rolled layers. This may even take place at elevated temperatures up to 40° C. or 50° C. The decrystallisation temperature of the adhesive layer (first polyurethane polymer) is >45° C. In the present invention no release papers or release liners are required.

In step (I) a substrate is provided. The substrate may be, for example, paper, cardboard, wood, textiles, metal, leather, glass, or a mineral material. Additionally, the substrate may also be a natural or synthetic rubber or made of various synthetic materials selected from the group consisting of polyurethanes, polyvinyl acetate, polyester, polypropylene, polyethylene, polyacetate, polylactide, polyvinyl chloride, cellophane, ABS, polycarbonate and polyamides. The substrates can also be used as mixtures of blendes of the aforementioned materials. Preferably the substrates are present in the form of webs. The substrate may be printed on one side or both sides.

Step (II) of the method according to the invention calls for the application of a first adhesive polyurethane and/or polyurethane-polyurea polymer onto the substrate. The application of the polymers in the inventive method may generally be effected by spraying, with plain rollers, gravure rollers, screen rollers, in serigraphy, also rotary serigraphy, and with a doctor-blade spreader, a chambered doctor blade or a rotary doctor blade, for example. The polymers may also be applied by casting onto the webs, allowing high coating rates to be achieved.

In the present invention the term "polyurethane and/or polyurethane-polyurea polymer" is meant to designate polyurethane polymers which may also comprise polyurea structures. Other linkages known in polyurethane chemistry within the polymer such as isocyanurate structures are also encompassed within this term.

The first polyurethane and/or polyurethane-polyurea polymer is selected in such a way that it is capable of attaining an at least partially crystalline state with a final degree of crystallinity. At a sufficiently low temperature (below the melting point of the polymer) and given enough time, the polymer will be present in a state with a degree of crystallinity which will not change any more on its own accord. The degree of crystallinity may be determined via the melt peak in a DSC (differential scanning calorimetry) measurement according to DIN 65467.

However, during and/or after the application this first polymer is in a non-crystalline state. This may be achieved by various methods. For example, the polymer may be applied as a hot melt. Another possibility is to apply the polymer as a solvent-containing preparation and then to evaporate the solvent by heating. It is preferred to apply the polymer in the form of a dispersion, particularly an aqueous dispersion, and to remove the liquid phase. The most preferred method of removing water or other liquids is to heat the coated substrate to a temperature which is above the melting point of the first polymer.

In step (III) an adhesive composition comprising a second polyurethane and/or polyurethane-polyurea polymer and furthermore an acrylate polymer is applied onto the first polymer of step (II). The timing of this step is such that the first polymer of step (II) is still in an amorphous state or has not yet reached its final degree of crystallinity. This composition may also be in the form of an (aqueous) dispersion, a solvent-containing preparation or a hot melt.

The temperature of the first polyurethane and/or polyurethane-polyurea polymer during step (III) may be above or below its melting point. For example, after the drying of an aqueous dispersion of the first polymer the coated substrate may leave a drying oven and cool to a temperature below the melting point of the polymer. Due to the slow crystallization of the polymer, it is still amorphous or has a low crystallinity when the composition of step (III) is applied. In very simple terms, the composition if step (III) is applied as long as the first polymer is still sticky.

The cooling in step (IV) may be an active or a passive cooling. By lowering the temperature below the glass transition temperature of the acrylate polymer, the coating of step (III) will become non-blocking and non-tacky. This is independent of the crystallization state of the first polyurethane and/or polyurethane-polyurea polymer.

An additional advantage of the composition of step (III) is that it may also form a heat-activated adhesive layer.

In summary, adhesive-coated articles may be produced at higher speeds and without the need for release layers when wound on a roll.

It is preferred that the composition of step (III) is in the form of an aqueous polymer dispersion mixture. The composition may, for example, contain 10 to 90% by weight of acrylate polymers and 10 to 90% by weight of polyurethane and/or polyurethane-polyurea polymers; more preferably, the composition contains 30 to 60% by weight of acrylate polymers and 40 to 70% by weight of polyurethane and/or polyurethane-polyurea polymers.

The composition of step (III) preferably has a solid matter content of 10 to 70% by weight, more preferably 25 to 60% by weight and most preferably 35 to 55% by weight.

Preferably, the second polyurethane and/or polyurethane-polyurea polymer has a weight average molecular weight in the range from 15,000 to 150,000 g/mol, more preferably in the range from 20,000 to 80,000 g/mol, most preferably in the range from 25,000 to 45,000 g/mol.

Preferably, the second polyurethane and/or polyurethane-polyurea polymer in the dispersion has an average particle diameter in the range from 30 to 400 nm, more preferably in the range from 100 to 300 nm, most preferably in the range from 150 to 280 nm. The particle diameter is determined by laser correlation spectroscopy (apparatus: Malvern Zetasizer 1000, Malvern Instruments LTD), and the Z-averages are given.

With respect to the acrylate polymer, this may preferably have a weight average molecular weight $M_w$ in the range from $10^3$ to $10^6$ g/mol, more preferably in the range from $10^4$ to $5*10^5$ g/mol, most preferably in the range from $2*10^4$ to $2*10^5$ g/mol.

Preferably, the acrylate polymer in the dispersion has an average particle diameter in the range from 40 to 200 nm, most preferably in the range from 80 to 160 nm. The particle diameter is determined by laser correlation spectroscopy (apparatus: Malvern Zetasizer 1000, Malvern Instruments LTD), and the Z-averages are given.

The solid matter content of the acrylate polymer dispersions according to the invention is between 25 and 65% by weight, preferably between 30 and 55% by weight, most preferably between 35 and 55% by weight. The solid matter content of a dispersion is generally determined from the ratio of water to organic starting materials.

The viscosity of the polymer dispersion composition in step (III) may be between 5 and 300 000 mPa·s, preferably between 10 and 150 000 mPa·s, most preferably between 15 and 15 000 mPa·s. The determination of viscosity may be performed with a VT-500 rotation viscosimeter of Fa. Haake according to DIN 53019.

The pH of the composition can be varied by adding defined quantities of a base and may be between pH 3 and 12, a pH of 6 to 9 being preferred. Most commonly, the polymerization is effected in the acid pH-range; and the neutralization is effected after the polymerization is complete. However, it is also possible already to add part of the base in the course of the polymerization in order to prevent an agglomeration, where appropriate. As bases the inorganic or organic bases known to those skilled in the art may be used; these include aqueous solutions of alkali hydroxides, ammonium hydroxide, organic amines such as triethylamine or ethyl diisopropylamine. Alkali hydroxides and ammonium hydroxide are preferred.

The present invention will be further described in connection with exemplary embodiments. The embodiments may as well be combined freely unless the context clearly indicates the contrary.

In a first embodiment of the method according to the invention, in step (III) the second polyurethane and/or polyurethane-polyurea polymer is an amorphous or crystalline polymer with a glass transition temperature from ≥−50° C. to ≤10° C. and the acrylate polymer has a glass transition temperature of ≥30° C., the glass transition temperatures being determined by differential scanning calorimetry according to DIN 65467 at a heating rate of 20 K/min, with a definition of $T_g$ as the midpoint temperature (tangent method).

Preferably, the acrylate polymer has a glass transition temperature $T_g$ in the range from ≥50° C. to ≤80° C., more preferably in the range from ≥60° C. to ≤70° C. and the second polyurethane and/or polyurethane-polyurea polymer has a glass transition temperature $T_g$ in the range from ≥−40° C. to ≤8° C., more preferably in the range from −10° C. to 5° C.

Below the glass transition temperature, amorphous polymers are brittle and rigid. This property is due to the immobility of the "frozen" polymer chains. When the glass transition temperature is exceeded the molecular chains become movable relative to one another and the polymer softens, the degree of softening depending on the type of the polymer, the molecular weight of the polymer and the temperature. Amorphous polymers, as compared with semi-crystalline polymers, show only a glass stage in the DSC (differential scanning calorimetry) measurement according to DIN 65467 during the transition from the brittle, rigid state to the softened state. A melt peak indicating a semi-crystallinity of the polymer does not occur in the DSC measurements.

In another embodiment of the method according to the invention the composition is applied via intaglio printing in step (III). This is the preferred method for reproducibly obtaining layers with a thickness of a few micrometers.

In another embodiment of the method according to the invention step (III) is performed ≥0.1 seconds to ≤60 seconds after the end of step (II). It is preferred that the time interval is ≥0.5 seconds to ≤5 seconds.

In another embodiment of the method according to the invention, in step (IV) the obtained article is cooled to a temperature below the glass transition temperature of the acrylate polymer via a chill roll. Using a chill roll allows for a convenient direct rolling of the obtained coated article.

In another embodiment of the method according to the invention the method is conducted as a roll-to-roll process.

In another embodiment of the method according to the invention the composition in step (III) has a thickness of ≥1 μm to ≤50 μm after drying. Preferably the thickness is ≥1 μm to ≤10 μm after drying.

In another embodiment of the method according to the invention the first polyurethane and/or polyurethane-polyurea polymer in step (II) is a latent reactive adhesive and furthermore the second polyurethane and/or polyurethane-polyurea polymer and/or the acrylate polymer in step (III) comprise free isocyanate reactive groups. When the coated article is heated, the polymers of the composition as mentioned in step (III) will soften and react with an isocyanate cross-linker in the latent reactive polymer layer.

In another embodiment of the method according to the invention the first polyurethane and/or polyurethane-polyurea polymer in step (II) has a melting temperature from ≥42° C. to ≤80° C., a glass transition temperature from ≥−100° C. to ≤−10° C. and a molecular weight $M_w$ from ≥20000 g/mol to ≤80000 g/mol, the glass transition temperature being determined by differential scanning calorimetry according to DIN 65467 at a heating rate of 20 K/min.

Preferably, the melting temperature is from ≥42° C. to ≤60° C. and more preferred from ≥45° C. to ≤52° C. It is also preferred that the glass transition temperature is from ≥−60° C. to ≤−40° C. and more preferably from ≥−59° C. to ≤−45° C. Preferred ranges for the molecular weight are from ≥25000 g/mol to ≤60000 g/mol and more preferably ≥30000 g/mol to ≤45000 g/mol.

In another embodiment of the method according to the invention the first polyurethane and/or polyurethane-polyurea polymer either possesses anionic or cationic hydrophilization.

In another embodiment of the method according to the invention a first polyurethane and/or polyurethane-polyurea polymer in step (II) that possesses cationic hydrophilization is obtainable by the reaction of:

(A') one or more semi-crystalline polyester polyols having a functionality of two or more and a molecular weight $M_n$ of ≥400 g/mol to ≤5000 g/mol,
(B') optionally one or more polyol components having a functionality of two or more and a molecular weight $M_n$ of ≥62 g/mol to ≤399 g/mol,
(C') one or more potentially cationic monomers having tertiary amino groups,
(D') one or more diisocyanate or polyisocyanate components and
(E') one or more diamino and/or monoamino compounds.

Suitable semi-crystalline polyester polyols (A') having a functionality of two or more are based on linear dicarboxylic acids and/or their derivatives, such as anhydrides, esters or acid chlorides, and on aliphatic or cycloaliphatic, linear or branched polyols. Suitable dicarboxylic acids are adipic acid, succinic acid, sebacic acid or dodecanedioic acid; adipic acid is preferred. They are used in amounts of at least 85 mol %, preferably of 90 to 100 mol %, based on the total amount of all the carboxylic acids.

Optionally it is possible to use other aliphatic, cycloaliphatic or aromatic dicarboxylic acids as well. Examples of such dicarboxylic acids are glutaric acid, azelaic acid, 1,4-, 1,3- or 1,2-cyclohexanedicarboxylic acid, terephthalic acid or isophthalic acid. These are used in amounts up to a maximum of 15 mol %, preferably of 0 to 10 mol %, based on the total amount of all the carboxylic acids.

Suitable polyol components for the semi-crystalline polyesters are monoethylene glycol, butane-1,4-diol, hexane-1,6-diol or neopentylglycol; butane-1,4-diol is preferred. These are used in amounts of at least 80 mol %, preferably of 90 to 100 mol %, based on the total amount of all the polyols.

Optionally it is possible to use other aliphatic or cycloaliphatic, linear or branched polyols as well. Examples of such polyols are diethylene glycol, neopentylglycol hydroxypivalate, cyclohexanedimethanol, pentane-1,5-diol, pentane-1,2-diol, nonane-1,9-diol, trimethylolpropane, glycerol or pentaerythritol. These are used in amounts of not more than 20 mol %, preferably of 0 to 10 mol %, based on the total amount of all the polyols.

Mixtures of two or more such polyesters (A') are also appropriate.

It is preferred to use polyesters (A') based on adipic acid and butanediol or adipic acid and hexanediol or adipic acid and a mixture of hexanediol and neopentylglycol.

Suitable synthesis components (B') are polyol components having a functionality of two or more and a number-average molecular weight of 62 to 399 daltons, such as, for example, polyethers, polyesters, polycarbonates, polylactones or polyamides.

Further suitable components (B') are the aliphatic or cycloaliphatic, linear or branched polyols identified under (A'). Preferred components (B') are monoethylene glycol, butane-1,4-diol or hexane-1,6-diol. Butane-1,4-diol is particularly preferred.

Potentially cationic monomers (C') having tertiary amino groups are, for example, tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, N-aminoalkyldialkylamines, the alkyl radicals and alkanediyl units of these tertiary amines being composed independently of one another of 2 to 6 carbon atoms. Additionally contemplated are polyethers containing tertiary nitrogen atoms and having preferably two terminal hydroxyl groups, of the kind obtainable in a conventional manner, for example, by alkoxylating amines having two hydrogen atoms attached to amine nitrogen, such as methylamine, aniline or N,N'-dimethylhydrazine.

Preferred potentially cationic monomers (C') are N,N'-bis(hydroxyalkyl)alkylamines, such as N-methyldiethanolamine, N-ethyldiethanolamine, N-propyldiethanolamine, N-methyldipropanolamine, N-ethyldipropanolamine, N-propyldipropanolamine; N-methyldiethanolamine is particularly preferred.

These tertiary amines are converted into the corresponding ammonium salts either with acids, examples being mineral acids such as phosphoric acid, sulphuric acid or hydrogen halide acids, or organic acids such as lactic acid, or by reaction with suitable quaternizing agents such as $C_1$ to $C_6$ alkyl halides, bromides or chlorides for example. It is preferred to use acids, more preferably phosphoric acid or lactic acid, very preferably phosphoric acid.

Suitable synthesis components (D') are any desired organic compounds which contain at least two free isocyanate groups per molecule. Preference is given to using diisocyanates $Y(NCO)_2$, where Y is a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms. Examples of such diisocyanates whose use is preferred are tetramethylene diisocyanate, methylpentamethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane, 2,2-bis(4-isocyanatocyclohexyl)propane, 1,4-diisocyanatobenzene, 2,4-diisocyanatotoluene, 2,6-diisocyanatotoluene, 4,4'-diisocyanatodiphenylmethane, 2,2'- and 2,4'-diisocyanatodiphenylmethane, tetramethylxylylene diisocyanate, p-xylylene diisocyanate, p-isopropylidene diisocyanate, and mixtures of these compounds.

It is of course also possible to make proportional accompanying use of the polyisocyanates of higher functionality that are known per se in polyurethane chemistry, or else of modified polyisocyanates that are known per se—containing, for example, carbodiimide groups, allophanate groups, isocyanurate groups, urethane groups and/or biuret groups.

Preferred diisocyanates (D') are aliphatic and araliphatic diisocyanates such as hexamethylene diisocyanate, 1,4-diisocyanatocyclohexane, 1-isocyanato-3,3,5-trimethyl-5-isocyanatomethylcyclohexane, 4,4'-diisocyanatodicyclohexylmethane or 2,2-bis(4-isocyanatocyclohexyl)propane, and mixtures of these compounds.

Preference extends to 2,4-diisocyanatotoluene and 2,6-diisocyanatotoluene and mixtures thereof.

Particularly preferred synthesis components (D') are mixtures of hexamethylene diisocyanate and 1-isocyanato-3,3,5-trimethyl-5-isocyanatomethylcyclohexane.

Appropriate synthesis components (E') include primary and/or secondary monoamino compounds and/or primary and/or secondary diamino compounds.

Examples of (E') are aliphatic and/or alicyclic primary and/or secondary monoamines such as ethylamine, diethylamine, the isomeric propyl- and butylamines, higher linear-aliphatic monoamines and cycloaliphatic monoamines such as cyclohexylamine. Further examples of are amino alcohols, i.e. compounds which contain amino groups and hydroxyl groups in one molecule, such as, for example, ethanolamine, N-methylethanolamine, diethanolamine and 2-propanolamine. It is of course also possible to use mixtures of two or more monoamino compounds.

Preferred monoamino compounds are diethylamine, ethanolamine or diethanolamine. Diethanolamine is particularly preferred.

Examples of diamino compounds are 1,2-ethanediamine, 1,6-hexamethylenediamine, 1-amino-3,3,5-trimethyl-5-aminomethylcyclohexane (isophoronediamine), piperazine, 1,4-diaminocyclohexane or bis(4-aminocyclohexyl)methane. Additionally appropriate are adipic dihydrazide, hydrazine or hydrazine hydrate. Polyamines such as diethylenetriamine as well can be used in lieu of a diamino compound.

Further examples are amino alcohols, i.e. compounds which contain amino groups and hydroxyl groups in one molecule, such as, for example, 1,3-diamino-2-propanol, N-(2-hydroxyethyl)ethylenediamine or N,N-bis(2-hydroxyethyl)ethylenediamine.

It is also possible to use mixtures of two or more diamino compounds (E').

Preferred diamino components are 1,2-ethanediamine, 1,6-hexamethylenediamine, 1-amino-3,3,5-trimethyl-5-aminomethylcyclohexane (isophoronediamine), piperazine, N-(2-hydroxyethyl)ethylenediamine or N,N-bis(2-hydroxyethyl)ethylenediamine.

Particularly preferred diamino components are 1,2-ethanediamine or N-(2-hydroxyethyl)ethylenediamine; N-(2-hydroxyethyl)ethylenediamine is especially preferred.

Particular preference for component (E') is given to mixtures of monoamino alcohols and diamino alcohols; a mixture of diethanolamine and N-(2-hydroxyethyl)ethylenediamine is especially preferred.

The amount of cationic groups is between 10 and 600 mmol per kg of solid, preferably between 100 and 400 mmol, more preferably between 150 and 300 mmol per kg of solid.

It is preferred that the first polyurethane and/or polyurethane-polyurea polymer in step (II) is applied in the form of an aqueous dispersion.

These dispersions may be prepared by charging a reactor in a first step with some or all of components (A'), (B'), (C') and (D'), optionally in the presence of a solvent which is miscible with water but inert towards isocyanate groups and heating this initial charge to temperatures in the range from 50 to 120° C., and subsequently metering in any of constituents (A'), (B'), (C') or (D') not added at the beginning of the reaction; in a second step, carrying out the chain extension with the mixture (E') at temperatures of 15 to 60° C., the conversion of the tertiary amino groups into cationic groups, and the transfer to the aqueous phase, taking place before, during or after the chain extension; and removing the solvent used—if appropriate—for the prepolymerization. Preferably no solvent is used in the prepolymerization.

The preparation of the aqueous polyurethane-polyurea dispersions can be carried out in one or more stages in homogeneous phase or, in the case of multi-stage reaction, in part in disperse phase. Following complete or partial polyaddition there is a dispersing, emulsifying or dissolving step. After that, if appropriate, there is a further polyaddition or modification in disperse phase. For the preparation it is possible to use all of the processes that are known from the prior art. Preference is given to using the acetone process.

Examples of suitable solvents are acetone, butanone, tetrahydrofuran, dioxane, acetonitrile, dipropylene glycol dimethyl ether and 1-methyl-2-pyrrolidone, preference being given to butanone or acetone; acetone is particularly preferred.

For preparing the prepolymer the amounts of the individual components (A') to (D') for use are calculated such as to result in a characteristic isocyanate number of 1.05 to 2.5, preferably of 1.1 to 1.5. The isocyanate content of the prepolymers is between 0.3% and 3.0%, preferably between 0.7% and 2.5%, more preferably between 1.3% and 1.9%.

Use is made of 50 to 96 parts by weight, preferably 75 to 90 parts by weight of component (A'), 0 to 10 parts by weight, preferably 0 to 5 parts by weight of component (B'), 0.1 to 10 parts by weight, preferably 0.5 to 5 parts by weight, more preferably 0.8 to 3.5 parts by weight of component (C') and 3 to 30 parts by weight, preferably 5 to 20 parts by weight of component D), with the proviso that the sum of the components amounts to ≤100 parts by weight. Optionally it is possible for component (B') to be present in amounts of 0.1 to 4 parts by weight in the composition.

The reaction of components (A'), (B') and (C') with (D'), based on the total amount of groups that are reactive towards isocyanates, takes place partially or completely, but preferably completely. The degree of reaction is customarily supervised by monitoring the NCO content of the reaction mixture. This can be undertaken using both spectroscopic measurements, e.g. infrared or near-infrared spectra, or determinations of the refractive index, and chemical analyses, such as titrations on samples taken.

To accelerate the isocyanate addition reaction it is possible to use customary catalysts, such as those known to a person skilled in the art for accelerating the NCO—OH reaction. Examples are triethylamine, 1,4-diazabicyclo[2.2.2]octane, dibutyltin oxide, tin dioctoate or dibutyltin dilaurate, tin bis (2-ethylhexanoate), zinc dioctoate, zinc bis(2-ethylhexanoate) or other organometallic compounds.

The chain extension with component (E') may be carried out prior to dispersing, during dispersing or after dispersing. Preferably the chain extension takes place prior to dispersing.

The chain extension is carried out at temperatures of 15 to 60° C., preferably of 25 to 55° C., more preferably of 40 to 50° C.

The concept of chain extension in the sense of the present invention also includes the reactions of the monoamino compounds, which, as a result of their monofunctionality, act as chain terminators and therefore lead not to an increase but instead to a decrease in the molecular weight. This is also true in particular of the amino alcohols, since in the temperature range selected their hydroxyl groups do not react, or react only in a very small part, with the isocyanate groups.

Component (E') can be added to the reaction mixture in a form diluted with water and/or with organic solvents. The addition of two or more aminic compounds (E') may be made in succession, in any order, or simultaneously, by addition of a mixture.

The conversion of the tertiary amino groups into cationic groups may take place before, during or after the chain extension, preferably after the chain extension. It may also take place before or during dispersing. It preferably takes place during dispersing, with the acid being added to the dispersion water.

The dispersion is prepared either by introducing the prepolymer into the dispersion water, where appropriate with strong shearing, such as vigorous stirring, for example, or else by stirring the dispersion water into the prepolymer. Subsequently it is possible for the chain extension to take place, if it has not already taken place in the homogeneous phase.

Following dispersing, the organic solvent used if appropriate, acetone for example, is removed by distillation.

The dispersions have a solids content of 10% to 70% by weight, preferably 25% to 60% by weight and more preferably 35 to 55% by weight.

In another embodiment of the method according to the invention the first polyurethane and/or polyurethane-polymer in step (II) and the second polyurethane and/or polyurethane-polyurea polymer in step (III) which in each case possess anionic hydrophilization is obtainable by the reaction of:
(A) at least one diol and/or polyol component,
(B) at least one di- and/or polyisocyanate component,
(C) at least one component having sulphonate and/or carboxylate groups,
(D) mono-, di- and/or tri-amino-functional and/or hydroxyamino-functional compounds, as appropriate,
(E) other isocyanate-reactive compounds, as appropriate.

It is preferred that the second polyurethane and/or polyurethane-polyurea polymer in step (III) is applied in the form of an aqueous dispersion.

The dispersions may have a solid matter content of 15 to 70% by weight, more preferably of 25 to 60% by weight and most preferably of 30 to 50% by weight. The pH-value may be in the range from 4 to 11, preferably from 6 to 10.

Suitable diol and/or polyol components (A) are compounds with at least two hydrogen atoms being reactive with isocyanates and having an average molecular weight of 62 to 18,000, preferably 62 to 4,000 g/mol. Examples of suitable structural components are polyethers, polyesters, polycarbonates, polyacetones and polyamides. Preferred polyols (A) have 2 to 4, more preferably 2 to 3 hydroxyl groups, most preferably 2 hydroxyl groups. Mixtures of different compounds of this type are also conceivable.

Possible polyester polyols include in particular linear polyester diols and slightly branched polyester polyols such as may be prepared in a known manner from aliphatic, cycloaliphatic or aromatic di- or polycarboxylic acids such as succinic, methyl succinic, glutaric, adipic, pimelic, suberic, azelaic, sebacic, nonane dicarboxylic, decane dicarboxylic, terephthalic, isophthalic, o-phthalic, tetrahydrophthalic, hexahydrophthalic, cyclohexane-dicarboxylic, maleic, fumaric, malonic or trimellitic acid as well as acid anhydrides such as o-phthalic, trimellitic or succinic acid anhydride or mixtures thereof with polyhydric alcohols such as ethanediol, di-, tri-, tetraethylene glycol, 1,2-propanediol, di-, tri-, tetrapropylene glycol, 1,3-propanediol, butanediol-1,4, butanediol-1,3, butanediol-2,3, pentanediol-1,5, hexanediol-1,6,2,2-dimethyl-1,3-propanediol, 1,4-dihydroxycyclohexane, 1,4-dimethylolcyclohexane, octanediol-1,8, decanediol-1,10, dodecanediol-1,12 or mixtures thereof, also using higher functional polyols such as trimethylolpropane, glycerine or pentaerythrite, where appropriate. Of course, cycloaliphatic and/or aromatic di- and polyhydroxyl compounds are also conceivable for the manufacture of the polyester polyols. Instead of the free polycarboxylic acid, the corresponding polycarboxylic acid anhydrides or corresponding polycarboxylic acid esters of low-order alcohols or mixtures thereof may also be used for the manufacture of the polyesters.

Of course, the polyester polyols may be homo- or copolymers of lactones which preferably are obtained by addition of lactones or lactone mixtures such as butyrolactone, ε-caprolactone and/or methyl-ε-caprolactone to suitable di- or higher functional starter molecules such as the low-molecular, polyhydric alcohols mentioned above as the structural components for polyester polyols. The corresponding polymers of ε-caprolactone are preferred.

Particularly preferred are polyester polyols containing isophthalic acid and/or terephthalic acid and other dicarboxylic acids as well as 2,2-dimethyl-1,3-propanediol and/or ethyleneglycol and/or butanediol and/or hexanediol, where appropriate, as structural components.

Most particularly preferred are polyester polyols containing isophthalic acid, adipic acid and 2,2-dimethyl-1,3-propanediol as structural components.

Polycarbonates having hydroxyl groups are also possible polyhydroxyl components (A), for instance of the type which may be prepared by reaction of diols such as 1,4-butanediol and/or 1,6-hexanediol with diarylcarbonates such as diphenylcarbonate, dialkylcarbonates such as dimethylcarbonate or phosgene. The resistance to hydrolysis of the polyurethane or polyurethane-urea dispersion adhesives may be improved by at least in part using polycarbonates having hydroxyl groups.

Suitable polyether polyols are, for instance, the polyaddition products of the styrene oxides, ethylene oxide, propylene oxide, tetrahydrofurane, butylene oxide, epichlorohydrin as well as their coaddition and grafting products as well as the polyether polyols obtained by condensation of polyhydric alcohols or mixtures thereof and by alcoxylation of polyhydric alcohols, amines and aminoalcohols.

The homo-, co- and graft polymers of propylene oxide and of ethylene oxide which are available by addition of the mentioned epoxides to low-molecular di- or triols, mentioned above as the structural components for polyether polyols, or to higher functional low-molecular polyols such as pentaerythrite or sugars or to water are suitable polyether polyols as the structural components (A).

Particularly preferred di- or higher functional polyols (A) are polyester polyols, polylactones and polycarbonates.

Most particularly preferred di- or higher functional polyols (A) are polyester polyols.

Other suitable components (A) are low-molecular diols, triols and/or tetraols such as ethanediol, di-, tri-, tetraethylglycol, 1,2-propanediol, di-, tri-, tetrapropyleneglycol, 1,3-propanediol, butanediol-1,4, butanediol-1,3, butanediol-2,3, pentanediol-1,5, hexanediol-1,6,2,2-dimethyl-1,3-propanediol, 1,4-dihydroxycyclohexane, 1,4-dimethylolcyclohexane, octanediol-1,8, decanediol-1,10, dodecanediol-1,12, neopentylglycol, 1,4-cyclohexanediol, 1,4-cyclohexanedimethanol, 1,4-, 1,3-, 1,2-dihydroxybenzene or 2,2-bis-(4-hydroxyphenyl)-propane (bisphenol (A), TCD-diol, trimethylolpropane, glycerine, pentaerythrite, dipenthaerytrite or mixtures thereof, if appropriate, using further diols or triols not mentioned.

Reaction products of the mentioned polyols, particularly of the low-molecular polyols, with ethylene and/or propylene oxide also may be employed as the polyols.

The low-molecular components (A) have a molecular weight of 62 to 400 g/mol and are preferably employed in combination with the polyester polyols, polylactones, polyethers and/or polycarbonates mentioned above.

The polyol component (A) is contained in the polyurethane according to the invention at 20 to 95, preferably a t30 to 90 and more preferably at 65 to 88% by weight.

As components (B) any organic compounds are suited which contain at least two free isocyanate groups per molecule. Preferably, diisocyanates $Y(NCO)_2$ are used, wherein Y represents a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms, or a divalent araliphatic hydrocarbon radical having 7 to 15 carbon atoms. Examples of such preferably used diisocyanates are tetramethylene diisocyanate, methylpentamethylene diisocyanate, hexamethylene diisocyanate, dodecamethylene diisocyanate, 1,4-diisocyanato-cyclohexane, 1-isocyanato-3,3,5-trimethyl-5-isocyanatomethyl-cyclohexane (=IPDI, isophorone diisocyanate), 4,4'-diisocyanato-dicyclohexylmethane, 4,4'-diisocyanato-dicyclohexylpropane-(2,2), 1,4-diisocyanatobenzene, 2,4-diisocyanatotoluene, 2,6-diisocyanatotoluene, 4,4'-diisocyanato-diphenyl-methane, 2,2'- and 2,4'-diisocyanatodiphenylmethane, tetramethylxylylene diisocyanate, p-xylylene diisocyanate, p-isopropylidene diisocyanate as well as mixtures consisting of these compounds.

Of course, it is also possible to use in part the higher functional polyisocyanates known per se in polyurethane chemistry or modified polyisocyanates known per se such as those having carbodiimide groups, allophanate groups, isocyanurate groups, urethane groups and/or biuret groups.

In addition to these simple diisocyanates, those polyisocyanate are also suited which contain heteroatoms in the radical linking the isocyanate groups and/or have a functionality of more than 2 isocyanate groups per molecule. The first ones, for instance, are polyisocyanates prepared by the modification of simple aliphatic, cycloaliphatic, araliphatic and/or aromatic diisocyanates with a uretdione, isocyanurate, urethane, allophanate, biuret, carbodiimide, imino-oxadiazin dione and/or oxadiazin trione structure. One example of a non modified polyisocyanate with more than 2 isocyanate groups per molecule is 4-isocyanatomethyl-1,8-octanediisocyanate (nonanetriisocyanate), for example.

Preferred diisocyanates (B) are aliphatic and araliphatic diisocyanates such as hexamethylene diisocyanate, 1,4-diisocyanatocyclohexane, 1-isocyanato-3,3,5-trimethyl-5-isocyanatomethyl-cyclohexane, 4,4'-diisocyanato-dicyclohexylmethane, 4,4'-diisocyanato-dicyclohexylpropane-(2,2), as well as mixtures consisting of these compounds which may optionally contain proportions of 2,4-diisocyanatotoluene and/or 2,6-diisocyanatotoluene.

Particularly preferred components (B) are hexamethylene diisocyanate, 1-isocyanato-3,3,5-trimethyl-5-isocyanatomethyl-cyclohexane, 4,4'-diisocyanato-dicyclohexyl-methane, 2,4-diisocyanatotoluene and 2,6-diisocyanatotoluene as well as mixtures thereof.

Most particularly preferred as the component (B) is 1-isocyanato-3,3,5-trimethyl-5-isocyanatomethyl-cyclohexane.

The component (B) is contained in the polyurethane according to the invention in quantities of 5 to 60, preferably of 6 to 45, and more preferably in quantities of 7 to 25% by weight.

Suitable components (C) which contain sulphonate or carboxylate groups are, for instance, diamino compounds or dihydroxy compounds which additionally carry sulphonate and/or carboxylate groups such as the sodium, lithium, potassium, tert.-amine salts of N-(2-aminoethyl)-2-aminoethane sulphonic acid, N-(3-aminopropyl)-2-aminoethane sulphonic acid, N-(3-aminopropyl)-3-aminopropane sulphonic acid, N-(2-aminoethyl)-3-aminopropane sulphonic acid, the analogous carboxyl acids, dimethylol propionic acid, dimethylol butyric acid, the reaction products in the sense of a Michael condensation of 1 Mol diamine such as 1,2-ethane diamine or isophorone diamine with 2 mol acrylic acid or maleic acid.

Preferred components (C) are N-(2-aminoethyl)-2-aminoethane sulphonate or dimethylol propionate.

Preferably, the acids are employed directly in their salt form as sulphonate or carboxylate. However, it is also possible to add the neutralizing agents partly or completely during or after the manufacture of the polyurethanes only.

Tert.-amines particularly suitable and preferred for the salt formation are triethylamine, dimethylcyclohexylamine, ethyldiisopropylamine, for example.

Other amines such as ammonia, diethanolamine, triethanolamine, dimethylethanolamine, methyldiethanolamine, aminomethylpropanol and also mixtures of the aforementioned and also further amines may also be employed for the salt formation. It is expedient for these amines to be added only after substantial reaction of the isocyanate groups.

It is also possible to employ other neutralizing agents such as sodium, potassium, lithium, calcium hydroxide for neutralizing purposes.

The component (C) is contained in the polyurethane according to the invention at 0.3 to 10, preferably at 0.5 to 5 and more preferably at 0.7 to 3.75% by weight.

Suitable components (D) are mono-, di-, trifunctional amines and/or mono-, di-, trifunctional hydroxyamines such as aliphatic and/or alicyclic primary and/or secondary monoamines such as ethylamine, diethylamine, the isomer propyl and butylamines, higher linearly aliphatic monoamines and cycloaliphatic monoamines such as cyclohexylamine. Further examples are aminoalcohols, i.e. compounds which contain amino and hydroxyl groups in one molecule such as ethanolamine, N-methylethanolamine, diethanolamine, diisopropanolamine, 1,3-diamino-2-propanol, N-(2-hydroxyethyl)-ethylenediamine, N,N-bis(2-hydroxyethyl)-ethylenediamine and 2-propanolamine. Further examples are diamines and triamines such as 1,2-ethanediamine, 1,6-hexamethylenediamine, 1-amino-3,3,5-trimethyl-5-aminomethyl-cyclohexane (isophoronediamine), piperazine, 1,4-diaminocyclohexane, bis-(4-aminocyclohexyl)-methane and diethylenetriamine. Furthermore, adipic acid dihydrazide, hydrazine or hydrazine hydrate is conceivable. Of course, mixtures of a plurality of the aforementioned compounds (D), optionally also together with ones not mentioned, may be employed.

Preferred components (D) are 1,2-ethanediamine, 1-amino-3,3,5-trimethyl-5-aminomethyl-cyclohexane, diethylenetriamine, diethanolamine, ethanolamine, N-(2-hydroxyethyl)-ethylenediamine and N,N-bis(2-hydroxyethyl)-ethylenediamine.

Particularly preferred components (D) are diethanolamine and N-(2-hydroxyethyl)-ethylenediamine; diethanolamine is more particularly preferred.

The components (D) as chain extension agents preferably serve to build up higher molecular weights or to limit molecular weights as monofunctional compounds and/or to additionally insert further reactive groups such as free hydroxyl groups as further cross linking positions, where appropriate.

The component (D) is contained in the polyurethane according to the invention in quantities of 0 to 10, preferably of 0 to 5 and more preferably in quantities of 0.2 to 3% by weight.

Components (E) which are optionally also used may for example be aliphatic, cycloaliphatic or aromatic monoalcohols with 2 to 22 C atoms such as ethanol, butanol, hexanol, cyclohexanol, isobutanol, benzyl alcohol, stearyl alcohol, 2-ethylethanol, cyclohexanol; hydrophilizingly acting, mono- or difunctional polyethers on the basis of ethylene oxide polymers or ethylene oxide/propylene oxide copolymers started on alcohols or amines such as polyether LB 25 (Bayer Material Science AG; Germany) or MPEG 750: methoxypolyethylene glycol, molecular weight 750 g/mol (e.g., Pluriol® 750, BASF AG, Germany); blocking agents common for isocyanate groups and re-separable at elevated temperatures such as butanonoxime, dimethylpyrazole, caprolactam, malonic acid ester, triazole, dimethyltriazole, tert.-butylbenzylamine, cyclopentanone carboxyethylester; unsaturated compounds containing groups accessible for polymerisation reactions such as hydroxyethyl acrylate, hydroxyethyl methacrylate, hydroxybutyl acrylate, hydroxybutyl methacrylate, hydroxypropyl acrylate, hydroxypropyl methacrylate, pentaerythrite trisacrylate, hydroxyfunctional reaction products of monoepoxides, bisepoxides and/or polyepoxides with acrylic acid or methacrylic acid.

The components (E) may be contained in the polyurethane according to the invention in quantities of 0 to 20, preferably of 0 to 10% by weight.

The use of component (E) may for example lead to polyurethane dispersions according to the invention which in addition to the reactive carboxyl groups contain further reactive groups enabling, for example, the application of various cross-linking mechanisms (Dual Cure) in order to obtain special properties such as a two-stage curing, optionally temporally offset, or a particularly high cross-linking density.

In a particularly preferred embodiment, this polyurethane and/or polyurethane-polyurea polymer contains a polyester diol which contains isophthalic acid, adipic acid and 2,2-dimethyl-1,3-propanediol as structural components, 1-isocyanato-3,3,5-trimethyl-5-isocyanatomethyl-cyclohexane, the sodium salt of N-(2-aminoethyl)-2-aminoethane sulphonic acid and diethanolamines as structural components.

These aqueous polyurethane and/or polyurethane-urea dispersions may be prepared in such a manner that the components (A), (B), optionally (C), and optionally (E) are transformed in a single- or multi-stage reaction into an isocyanate-functional prepolymer which subsequently, in a single- or multi-stage reaction, is transformed optionally with component (C) and optionally (D), and then is dispersed in or with water, wherein the solvent used, if any, may be removed partly or completely by distillation during or after the dispersion.

The preparation may be performed in one or more stages in homogeneous or, in the case of a multi-stage reaction, partly in disperse phase. After the completely or partly performed polyaddition a dispersing, emulsifying or dissolving step is carried out. Subsequently, a further polyaddition or modification is optionally carried out in disperse phase. All methods known in the prior art such as emulsifier-shear force, acetone, prepolymer-mixing, melt-emulsifying, ketimine and solid-matter spontaneous dispersing methods or derivatives thereof may be used for the manufacture. A summary of these methods is to be found in Methoden der organischen Chemie (Methods of Organic Chemistry) (Houben-Weyl, extension and continuation volumes to the $4^{th}$ edition, volume E20, H. Bard and J. Falbe, Stuttgart, New York, Thieme 1987, pp. 1671-1682). The melt-emulsifying, prepolymer-mixing and acetone methods are preferred. The acetone method is particularly preferred.

In principle, it is possible to weigh in all hydroxyl-functional components, then to add all isocyanate-functional components and to transform this into isocyanate-functional polyurethane which then will be reacted with the amino-functional components. A reverse manufacture by filling in the isocyanate component first, adding the hydroxyl-functional components, transforming into polyurethane and then reacting with the amino-functional components to form the final product is also possible.

Conventionally, for the manufacture of a polyurethane polymer in the reactor the hydroxyl-functional components (A), optionally (C), and optionally (E) are filled in first, optionally diluted with a solvent which is mixable with water but inert to isocyanate groups, and then homogenized. Subsequently, at room temperature up to 120° C., the component (B) is added and isocyanate-functional polyurethane is manufactured. This reaction may be carried out in a single stage or in a plurality of stages. A multi-stage reaction, for instance, may occur such that a component (C) and/or (E) is filled in first and after the reaction with the isocyanate-functional component (B) a component (A) is added which then may react with part of the still existing isocyanate groups.

Suitable solvents are for example acetone, methylisobutylketone, butanone, tetrahydrofurane, dioxane, acetonitrile, dipropylene glycol dimethyl ether and 1-methyl-2-pyrrolidone, which may be added not only at the beginning of the manufacture but optionally also in part later. Acetone and butanone are preferred. It is possible to perform the reaction at normal pressure or elevated pressure.

For the manufacture of the prepolymer the used quantities of the hydroxyl- and, where appropriate, amino-functional components are selected such as to result in an isocyanate index of 1.05 to 2.5, preferably of 1.15 to 1.95, more preferably of 1.3 to 1.7.

The further transformation, the so-called chain extension, of the isocyanate-functional prepolymer with further hydroxyl- and/or amino-functional, preferably only amino-functional components (D) and optionally (C) is effected such that a transformation degree of 25 to 150, preferably of 40 to 85% of hydroxyl and/or amino groups, based on 100% of isocyanate groups, is selected.

With transformation degrees of more than 100%, which are possible but less preferred, it is advisable to react all monofunctional components in the sense of the isocyanate addition reaction with the prepolymer first and subsequently to employ the di- or higher functional chain extension components, in order to obtain as complete an integration of the chain extension molecules as possible.

The transformation degree is conventionally monitored by tracking the NCO content of the reaction mixture. Additionally, spectroscopic measurements, e.g. infrared or near-infrared spectra, determinations of the refractive index as well as chemical analyses such as titrations of samples taken may be carried out.

For the acceleration of the isocyanate addition reaction, conventional catalysts such as are known by those skilled in the art for the acceleration of the NCO—OH reaction may be employed. Examples are triethylamine, 1,4-diazabicyclo-[2,2,2]-octane, dibutyl tin oxide, tin dioctoate or dibutyl tin dilaurate, tin-bis-(2-ethylhexanoate) or other metallo-organic compounds.

The chain extension of the isocyanate-functional prepolymer with the component (D) and optionally (C) may be performed before the dispersion, during the dispersion or after the dispersion. The chain extension is preferably performed before the dispersion. If component (C) is employed as a chain extension component then a chain extension with this component before the dispersion step is mandatory.

The chain extension is conventionally performed at temperatures of 10 to 100° C., preferably of 25 to 60° C.

The term chain extension in the sense of the present invention also involves the reactions of monofunctional components (D), if any, which due to their monofunctionality act as chain terminators and thus do not lead to an increase but to a limitation of the molecular weight.

The components of the chain extension may be added to the reaction mixture diluted with organic solvents and/or with water. The addition may be effected successively in any order or simultaneously by adding a mixture.

For the purposes of manufacturing the dispersion, the prepolymer is charged into the dispersing water or conversely the dispersing water is stirred into the prepolymers, with strong shearing action such as strong agitation. Subsequently, the chain extension may then be carried out if it has not already taken place in the homogeneous phase.

During and/or after dispersing, the organic solvent used, if any, such as acetone is distilled off.

The following is a preferred manufacturing method:

Component (A), optionally component (C), and optionally component (E), and optionally solvents, are filled in first and heated up to 20 to 100° C. While stirring, component (B) is added as fast as possible. Exploiting the exothermy, the reaction mixture is stirred at 40 to 150° C. until the theoretical isocyanate content is achieved or slightly fallen below. While doing so, a catalyst may optionally be added. Subsequently, the mixture is diluted to a solid matter content of 25 to 95, preferably of 35 to 80% by weight by adding solvent; and then the chain extension is performed by adding the component (E) diluted with water and/or solvent, optionally together with component (C), at 30 to 120° C. After a reaction period of 2 to 60 minutes, it is dispersed by adding distilled water or by transferring into distilled water filled in first and the solvent used is partly or completely distilled off during or after the dispersing step.

In another embodiment of the method according to the invention the acrylate polymer in step (III) is obtainable by the reaction of:
(a) ≥40% to ≤70% by weight of styrene and/or other vinyl aromatic compounds,
(b) ≥4% to ≤40% by weight of an acrylic ester,
(c) ≥2% to ≤5% by weight of an acid-functional, olefinically unsaturated monomer and
(d) ≥10% to ≤40% by weight of a methacrylic ester,
wherein the total weight proportions of the components (a) to (d) amount to ≤100% by weight.

It is preferred that the acrylate polymer in step (III) is applied in the form of an aqueous dispersion.

Suitable vinyl aromatic compounds (a) are, for instance, vinyltoluene, o- and p-methylstyrene, butylstyrene, 4-n-butylstyrene, 4-n-decylstyrene, halogenated styrenes such as monochlorostyrenes, dichlorostyrenes, tribromostyrenes or tetrabromostyrene. Styrene is preferred.

Suitable acrylic esters (b) particularly comprise methylacrylate, ethylacrylate, propylacrylate, isopropylacrylate, n-butylacrylate, sec-butylacrylate, tert.-butylacrylate, pentylacrylate, hexylacrylate, heptylacrylate, octylacrylate, 2-octylacrylate, ethylhexylacrylate, nonylacrylate, 2-methyl-octylacrylate, 2-tert.-butylheptylacrylate, 3-iso-propylheptylacrylate, decylacrylate, undecylacrylate, 5-methylundecylacrylate, dodecylacrylate, 2-methyldodecylacrylate, tridecylacrylate, 5-methyltridecylacrylate, tetradecylacrylate, pentadecylacrylate, hexadecylacrylate, 2-methylhexade-cylacrylate, heptadecylacrylate, 5-isopropylheptadecylacrylate, 5-ethyloctadecylacrylate, octadecylacrylate, nonadecylacrylate, eicosylacrylate, cycloalkylacrylates such as cyclopentylacrylate, cyclohexylacrylate, 3-vinyl-2-butylcyclohexylacrylate, cycloheptylacrylate, cyclooctylacrylate, bornylacrylate, tetrahydrofurfurylacrylate and isobornylacrylate. Ethylacrylate, n-butylacrylate, ethylhexylacrylate, cyclohexylacrylate are preferred; ethylacrylate, n-butylacrylate or ethylhexylacrylate are particularly preferred.

Suitable olefinically unsaturated, acid-functional monomers (c) are sulphone, phosphate or carboxyl acid functional monomers, unsaturated carboxyl acid functional monomers such as acrylic acid, methacrylic acid, β-carboxyethylacrylate, crotonic acid, fumaric acid, maleic acid anhydride, itaconic acid or monoalkyl ester of dibasic acids or anhydrides such as maleic acid monoalkyl ester are preferred. Furthermore, unsaturated, radicalically polymerizable compounds with phosphate or phosphonate groups or sulphonic acid or sulphonate groups, such as are described in WO-A 00/39181 (p. 8, l. 13-p. 9, l. 19), are also suited as compounds of component (d). Acrylic acid or methacrylic acid is particularly preferred; acrylic acid is most preferred.

Suitable methacrylic esters (d) particularly comprise methyl methacrylate, ethyl methacrylate, propyl methacrylate, isopropyl methacrylate, n-butyl methacrylate, sec-butyl methacrylate, tert-butyl methacrylate, pentyl methacrylate, hexyl methacrylate, heptyl methacrylate, octyl methacrylate, 2-octyl methacrylate, ethylhexyl methacrylate, nonyl methacrylate, 2-methyloctyl methacrylate, 2-tert.-butylheptyl methacrylate, 3-iso-propylheptyl methacrylate, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate, pentadecyl methacrylate, hexadecyl methacrylate, 2-methylhexadecyl methacrylate, heptadecyl methacrylate, 5-iso-propylheptadecylmethacrylate, 5-ethyloctadecyl methacrylate, octadecyl methacrylate, nonadecyl methacrylate, eicosyl methacrylate, cycloalkyl methacrylates such as cyclopentyl methacrylate, cyclohexyl methacrylate, 3-vinyl-2-butylcyclohexyl methacrylate, cycloheptyl methacrylate, cyclooctyl methacrylate, bornyl methacrylate, tetrahydrofurfuryl methacrylate or isobornyl methacrylate. Furthermore, the derivatives of methacrylic acid also may be employed in the form of the corresponding nitriles or amides such as methacrylnitrile or methacrylamide. Additionally there is the possibility to use other functional monomers depending on the desired application, such as diacetone methacrylamide or acetoacetoxyethyl methacrylate. Methyl methacrylate, ethyl methacrylate, butyl methacrylate, tert-butyl methacrylate are preferred; methyl methacrylate, tert-butyl methacrylate or butyl methacrylate are particularly preferred.

The manufacture of the polyacrylate dispersions may be performed in a manner known per se, such as by means of emulsion polymerization. Conveniently, it is performed by an inflow method wherein water, emulsifier and a small quantity of an initiator, where appropriate, are filled in first. In doing so, the filled in material preferably contains 40 to 80 parts by weight of water, based on the total amount of water, 0.1 to 1.5 parts by weight of emulsifier, based on the solid matter, and 0.01 to 0.3% by weight of an initiator, based on the solid matter, where appropriate, wherein the given parts by weight add to 100.00 parts by weight. Subsequently, a small quantity of the monomers, preferably 5 to 15% by weight, is added, and the initiator, preferably 0.01 to 0.3% by weight, is optionally added at the same time, to form an internal seed on which the further polymerization steps take place.

Then the monomers in the aforementioned proportions are continuously added to this internal seed and polymerized up to a conversion of at least 95.0% by weight, preferably at least 98.0% by weight, more preferably at least 99.0% by weight, most preferably at least 99.5% by weight, based on their respective total weights.

Normally, the emulsion is polymerized at a temperature of 30 to 100° C., preferably of 50 to 90° C.

The dispersions containing an acrylate polymer are stabilized by means of ionic and/or non-ionic emulsifiers and/or protective colloids, inter alia. As the ionogenic emulsifiers, primarily anionic emulsifiers are conceivable. These may be the alkali or ammonium salts of alkyl, aryl, or alkylaryl sulphonates, phosphates, phosphonates or compounds with other anionic end groups where oligo- or polyethylene-oxide units also may be located between the hydrocarbon radical and the anionic group. Typical examples are sodium laurylsulphate, sodium lauryldiglykolsulphate, sodium decylglykolethersulphate, sodium octylphenolglykolethersulphate or sodium dodecylbenolsulphate.

As the non-ionic emulsifiers, alkylpolyglycol ethers such as ethoxylation products of lauryl, oleyl or stearyl alcohol or of mixtures such as coconut oil alcohol are conventionally used. Alkylphenolpolyglycol ethers such as ethoxylation products of octyl or nonylphenol, diisopropylphenol, triisopropylphenol, di- or tri-tert-butylphenol are also suited. In addition to the mentioned compound classes, ethoxylation products of propylene oxide may also be employed.

As suitable protective colloids natural substances such as gum arabic, starch, alginates or modified natural substances such as methyl, ethyl, hydroxyalkyl or carboxymethyl cellulose or synthetic substances such as polyvinyl alcohol or modified polyvinyl alcohols or polyvinyl pyrrolidones are used.

The emulsifiers also may be modified by a corresponding functionalization such that they radicalically copolymerize with the monomers (surfmer).

Furthermore, it is also possible to use mixtures of the aforementioned emulsifiers.

An alkyl phosphate ester such as a phosphate ester of non-ionic and polyoxyethylene adducts (available under the name Dextrol OC® from Hercules firm, USA) is preferably employed as emulsifier. The total amount of emulsifier, based on the solid matter, is 0.3 to 1.5% by weight, preferably 0.3 to 1.0% by weight.

The emulsion is normally polymerized at 30 to 100° C., preferably 50 to 90° C. The polymerization medium may consist of water alone or of mixtures of water and liquids mixable therewith such as methanol. It is preferred to use water only. Emulsion polymerization may be performed both as a batch process and in the form of an inflow method including stage or gradient operation; the inflow method is preferred. With the inflow method polymerization is effected at a comparably small monomer pad wherein one or more monomers in pure or emulsified form and the mostly water-soluble auxiliary agents are added continuously, in stages or in the form of a gradient over various spatially separated inflows. The particle size is set by means of the formation in situ of an internal seed, the particle size of the seed being determined from the ratio of emulsifier to monomer. It is also possible to control the particle size by filling in an external seed with defined particle size first. The way the initiator is added to the polymerization vessel in the course of the radicalic aqueous emulsion polymerization is known to those skilled in the art. It may be filled in completely first or employed continuously or in stages in accordance with its consumption in the course of the radicalic aqueous emulsion polymerization. In particular, this depends on the chemical nature of the initiator system as well as on the polymerization temperature. Preferably one part is filled in first and the remainder is supplied to the polymerization zone in accordance with the consumption.

The dispersions used in the method according to the invention may be employed alone or with the binding agents, additives and admixtures known in the art of coating and adhesive technology, particularly emulsifiers and light stabilizers such as UV absorbers and sterically hindered amines (HALS), and also antioxidants, fillers and auxiliary agents, e.g. antisettling agents, antifoaming and/or surface-active agents, levelling agents, reactive diluents, softeners, neutralizing agents, catalysts, auxiliary solvents and/or thickeners and additives such as pigments, colours or matting agents. Tackifying agents ("tackifiers") may also be added. Tackifying resins are understood to mean all natural and synthetic resins or polymers which as additives increase the tackiness, i.e. the property of firm adhesion to surfaces after short, light contact pressure. To achieve this, adhesive resins have to have a sufficient compatibility with the polymers, inter alia. There is no need for the tackifiers themselves to have tackiness. Commonly used tackifiers are terpene oligomers, aliphatic petrochemical resins or colophony resins, among others.

A further aspect of the present invention is an article of manufacture, obtainable by a method according to the present invention, comprising:
a substrate;
a first layer adjacent to the substrate,
   the first layer comprising a first polyurethane and/or polyurethane-polyurea polymer which has a melting temperature from $\geq 42°$ C. to $\leq 80°$ C., a glass transition temperature from $\geq -100°$ C. to $\leq -10°$ C. and a molecular weight $M_w$ from $\geq 20000$ g/mol to $\leq 80000$ g/mol, and
a second layer adjacent to the first layer,
   the second layer comprising a second polyurethane and/or polyurethane-polyurea polymer with a glass transition temperature from $\geq -50°$ C. to $\leq 10°$ C. and
   further comprising an acrylate polymer which has a glass transition temperature of $\geq 30°$ C.,
all glass transition temperatures being determined by differential scanning calorimetry according to DIN 65467 at a heating rate of 20 K/min.

In an embodiment of the article according to the invention the article does not comprise a release paper or a release film.

Yet another aspect of the present invention is the use of an article according to the present invention for the coating of an object.

The present invention is further described with reference to the examples given below without wishing to be limited by the examples.

1. Methods

1.1 Determination of the Glass Transition Temperature

The glass transition temperature Tg was determined by DSC (Differential Scanning calorimetry) according to DIN 65467 with a DSC-7 calorimeter from Perkin-Elmer as the measuring instrument. The calibration of the temperature was effected by means of the melt-onset temperatures of indium and lead, the calibration of the heat tone by means of the melt surface integral of indium.

About 10 mg of the test substance were filled into a DSC crucible and compacted with a punch therein; the crucible was tightly closed with a lid.

Heating was carried out three times consecutively in the temperature range from −100° C. up to the end temperatures of +80° C. in the first heating and +150° C. in the second and third heatings. The heating rate was 20 K/min, the cooling rate 320 K/min. Cell flushing gas was helium (30 ml/min); cell cooling was carried out with liquid nitrogen.

The glass transition temperature was evaluated according to DIN 51005 by placing tangents to the DSC measurement curve and was the temperature at half the height of the glass transition after the third heating.

1.2 Manufacture of the Adhesive Films to Measure the Storage and Loss Modulus The mixtures of the dispersions are poured out into a Teflon tray such that adhesive films with a thickness of about 2 mm result (assumption: density of the dispersions=1 g/cm$^3$). The dispersions poured out are dried at 23° C./50% relative moisture for 1 week. The adhesive films then are used to determine storage and loss modulus data.

1.3 Preparation of Adhesive Film for Tack Measurement

The dispersions were applied to aluminium plates using a 100 μm doctor blade. The solid matter content of the dispersions was adjusted beforehand using deionized water in such a way that, after drying, the desired thickness of the polymer films resulted (assumption: density of the dispersions and the polymers 1 g/cm$^3$). The dispersion layers were dried for 24 hours in a standard operating environment (23° C./50% relative moisture).

Tack Measurement

The tack measurements were carried out using the texture analyser of Stable Micro Systems Ltd., Surrey UK. The V4A probe of the texture analyser has a diameter of 5 mm.

To carry out the tack measurement, the V4A probe of the texture analyser was pressed onto the polymer film for 1 sec using a weight of 600 g (for the V4A probe, this corresponds to a pressure of 3 bar). The V4A probe was then withdrawn at a right angle from the polymer layer at a speed of 0.1 mm/sec. and the max. force [N/mm$^2$] for the separation procedure was recorded.

The aluminium plates coated with polymers were then heated to 70° C. for 2 min. on the heating plate of the texture analyser. The first tack measurement was carried out at 70° C. The temperature adjustment of the heating plate of the texture analyser was subsequently adjusted to 23° C., the Peltier element of the heating plate cooling to 23° C. within 3 min. The tack values of the adhesive layers were determined at intervals of 1 min. in each case. The measurements were carried out until the tack value fell to 0.001N/mm$^2$.

1.4 Determination of the Particle Diameter

The average particle size (APS) was determined by laser correlation spectroscopy (apparatus: Malvern Zetasizer 1000, Malvern Instruments LTD), and the Z-averages are given.

1.5 Determination of the Solid Matter Content (SMC)

The solid matter content was determined in accordance with DIN-EN ISO 3251.

1.6 Determination of the Molecular Weight

The weight average molecular weights $M_w$ were determined by GPC (Gel Permeation Chromatography):
Apparatus: Hewlett Packard 1100 series II with refraction index detector
Column heating installation: VDS-Optilab Jetstream 2 Plus
Columns:
1. PSS HEMA 40; 50×7.8 mm; Polymer Standard Services
2. Suprema 1000; 300×7.8 mm; Polymer Standard Services
3. PSS HEMA 300; 300×7.8 mm; Polymer Standard Services
4. PSS HEMA 40; 300×7.8 mm; Polymer Standard Services
5. PSS HEMA 40; 300×7.8 mm; Polymer Standard Services Mobile phase: dimethyl acetamide
Conditions: flow rate 0.6 ml/min; pressure 110 bar; temperature 30° C.
Standard: PSS Polymer—Standard—Service GmbH, Mainz; Germany

1.7 Determination of the Viscosity

The determination of viscosity may be performed with a VT-500 rotation viscosimeter of Fa. Haake according to DIN 53019.

2. Materials

2.1 Materials for the Synthesis of the First Polyurethane and/or Polyurethane-Polyurea Polymer Polyester I: 1,4-butanediol polyadipate diol of OH N=50 mg KOH/g
Polyester II: Polyesterdiol of 1,6-hexanediol, neopentylglycol and adipic acid, of OH N=66
Desmodur® H: Hexamethylene 1,6-diisocyanate (Bayer MaterialScience AG, Leverkusen/D)
Desmodur® I: Isophorone diisocyanate (Bayer MaterialScience AG, Leverkusen/D)

2.2 Materials Used for the Synthesis of the Second Polyurethane and/or Polyurea Polymer Baycoll® AD 2047: Linear polyester diol, OH number 55 mg KOH/g, 2000 g/mol, Bayer MaterialScience AG, Germany
Desmodur® I: Isophorone diisocyanate (Bayer MaterialScience AG, Leverkusen/D)

2.3 Materials Used for the Synthesis of the Acrylate Polymer

Acrylic acid (ACS): CAS 79-10-7, Aldrich, DE
Methyl methacrylate (MMA): CAS 80-62-6, Aldrich, DE
Styrene (S): CAS 100-42-5, Aldrich, DE
N-butylacrylate (BA): CAS 141-32-2, Aldrich, DDE
Butylmethacrylate (BMA): CAS 97-88-1, Aldrich, DE
Ammonium persulphate (APS): CAS 7727-54-0, Aldrich, DE
Emulsifier Tannemul® 951 (E951): CAS 68610-22-0, Tanatex, DE
Emulsifier Emulsogen® APS 100: Alkane sulfonate, Clariant, DE
Emulsifier Dextrol OC 40®: Phosphate Ester of Tridecyl Alcohol Ethoxylate
N-dodecylmercaptan: CAS 112-55-0, Aldrich, DE

3. Synthesis

3.1 Synthesis of the First Polyurethane and/or Polyurethane-Polyurea Polymer

3.1.1 Cationic Polyester-Polyurethane Dispersion

A mixture of 450 g of polyester I and 42.5 g of polyester II was dewatered at 110° C. and 15 mbar for 1 hour. At 60° C. 15.49 g of N-methyldiethanolamine, 53.76 g of Desmodur® H and then 35.52 g of Desmodur® I were added. The mixture was stirred at 80° C. until a constant isocyanate content of 1.56% was reached. The reaction mixture was dissolved in 896 g of acetone and in the course of that procedure was cooled to 50° C. The homogeneous solution was admixed with vigorous stirring with a solution of 2.81 g of N-(2-hydroxyethyl)ethylenediamine and 7.95 g of diethanolamine in 36 g of water. After 30 minutes dispersion was carried out by addition of a mixture of 14.3 g of 85% strength phosphoric acid and 894 g of water over the course of 20 minutes. Distillative removal of the acetone gave a solvent-free, aqueous, cationically hydrophilicized polyurethane-polyurea dispersion having a solids content of 40.2% by weight and an average particle size of the disperse phase, determined by laser correlation, of 193 nm.
Average molecular weight $M_w$=39600 g/mol
Glass transition temperature $T_g$=−57° C.
Melting temperature $T_m$=49° C.

3.1.2 Cationic Polyester-Polyurethane Dispersion

A mixture of 450 g of polyester I and 42.5 g of polyester II was dewatered at 110° C. and 15 mbar for 1 hour. At 60° C. 15.49 g of N-methyldiethanolamine, 53.76 g of Desmodur® H and then 35.52 g of Desmodur® I were added. The mixture was stirred at 80° C. until a constant isocyanate content of 1.58% was reached. The reaction mixture was dissolved in 896 g of acetone and in the course of that procedure was cooled to 50° C. The homogeneous solution was admixed with vigorous stirring with a solution of 2.81 g of N-(2-hydroxyethyl)ethylenediamine and 10.60 g of diethanolamine in 45 g of water. After 30 minutes dispersion was carried out by addition of a mixture of 14.3 g of 85% strength phosphoric acid and 889 g of water over the course of 20 minutes. Distillative removal of the acetone gave a solvent-free, aqueous, cationically hydrophilicized polyurethane-polyurea dispersion having a solids content of 40.3% by weight and an average particle size of the disperse phase, determined by laser correlation, of 180 nm.
Average molecular weight $M_w$=33600 g/mol
Glass transition temperature $T_g$=−47° C.
Melting temperature $T_m$=48° C.

3.2 Synthesis of the Second Polyurethane and/or Polyurethane-Polyurea Polymer (=PUD 1)

486.25 g of Baycoll® AD 2047 polyester were dehydrated for 1 hour at 100° C. and 15 mbar. At 60° C. 80.52 g of Desmodur® I were added. The mixture was agitated at 90° C. until an isocyanate content of 1.80 was reached. The reaction mixture was dissolved in 850 g acetone and in doing so cooled down to 50° C. A solution of 9.62 g sodium salt of N-(2-aminoethyl)-2-aminoethane sulphonic acid and 8.20 g diethanolamine in 170 g of water was added to the homogenous solution, with strong stirring. After 30 minutes of stirring, the mixture was dispersed at 50° C. within 20 minutes by adding 715 g of water. After the separation of the acetone by distillation, a solvent-free, aqueous polyurethane-polyurea dispersion with a solid matter content of 40.1% by weight, an average particle size of the disperse phase of 250 nm and a pH of 6.7 was obtained. The glass transition temperature $T_g$ was +2° C., and the weight average molecular weight $M_w$ was 35500 g/mol.

3.3 Synthesis of the Acrylate Polymer

General Synthesis Specification:

In a 3 l glass reactor with controlled heating and cooling and an agitator motor, in a nitrogen atmosphere, water is filled in first along with the corresponding emulsifier quantity E1. Subsequently, the solution is heated to the given temperature. After reaching the polymerization temperature, the monomer mixture M1 and the initiator mixture W1 for the preparation of the internal seed are added by means of a metering pump within 30 min. Thereafter, the monomer mixture M2 and the aqueous solution W2 are added at the corresponding temperature within 240 min. Immediately after the additions M2 and W2 are complete, the aqueous solution W3 for the post-activation is added within 60 min.; the dispersion continues to be agitated for a period of 60 min. and subsequently is cooled down. To set the pH to 7, the corresponding quantity of ammoniacal solution (W4) is slowly added in drops, and the finished dispersion is discharged over a 125 mm filter.

The following table summarizes the results of examples 3.3.1 to 3.3.5 which were performed according to the general procedure above.

|  |  | Example | | | | |
|---|---|---|---|---|---|---|
|  |  | 3.3.1 | 3.3.2 | 3.3.3 | 3.3.4 | 3.3.5 |
| First fill (E1) | Emulsifier 951 (21.5%) | 0 | 28 | 28 | 28 | 28 |
|  | Emulsogen APS 100 | 10 | 0 | 0 | 0 | 0 |
|  | Dextrol OC 40 | 5.5 | 0 | 0 | 0 | 0 |
|  | E-water | 700 | 678 | 678 | 678 | 678 |
|  | Ammonia | 0.65 | 0 | 0 | 0 | 0 |
| M1 | Methyl methacrylate | 8.5 | 8.5 | 8.5 | 8.5 | 8.5 |
|  | Butyl acrylate | 15 | 20 | 20 | 20 | 20 |
|  | Styrene | 30 | 60 | 60 | 60 | 60 |
| W1 | Ammonium persulphate | 0.5 | 0.5 | 0.5 | 0.5 | 0.5 |
|  | E-water | 70 | 70 | 70 | 70 | 70 |
| M2 | Methyl methacrylate | 85 | 180 | 255 | 85 | 180 |
|  | Butyl acrylate | 205 | 105 | 30 | 200 | 105 |
|  | Butyl methacrylate | 55 | 55 | 55 | 55 | 55 |
|  | Styrene | 625 | 595 | 595 | 595 | 595 |
|  | 1.6-hexandiol dimethacrylate | 5 | 0 | 0 | 0 | 0 |
|  | Acrylic acid | 29 | 29 | 29 | 29 | 29 |
|  | n-dodecyl mercaptan | 0 | 5.4 | 5.4 | 21.85 | 21.9 |
| W2 | Ammonium persulphate | 4.3 | 4.25 | 4.25 | 4.3 | 4.3 |
|  | Dextrol OC 40 | 5.5 | 0 | 0 | 0 | 0 |
|  | Emulsifier 951 (21.5%) | 0 | 27.5 | 27.5 | 28.5 | 28.5 |
|  | Ammonia (33%) | 1.5 | 0 | 0 | 0 | 0 |
|  | E-water | 600 | 575 | 575 | 595 | 575 |
| W3 | Ammonium persulphate | 0.65 | 0.65 | 0.65 | 0.65 | 0.65 |
|  | E-water | 70 | 70 | 70 | 70 | 70 |
| W4 | Ammonia (33%) | 11.5 | 7.63 | 7.63 | 9.28 | 7.8 |
|  | E-water | 23.5 | 16.5 | 16.5 | 18 | 18.5 |
| Temperature/° C. |  | 80 | 80 | 80 | 80 | 80 |
| $T_g$/° C. |  |  | 65 | 77 | 91.5 | 52 | 70 |

-continued

|  | Example | | | | |
|---|---|---|---|---|---|
|  | 3.3.1 | 3.3.2 | 3.3.3 | 3.3.4 | 3.3.5 |
| Solid contents/% | 42 | 42 | 42 | 42 | 42 |
| pH | 8 | 7 | 7 | 7 | 7 |
| Mean particle size/nm | 105 | 102 | 103 | 106 | 103 |
| Viscosity/mPa · s (D = 45.3 s$^{-1}$) | 64 | 21 | 22 | 27 | 25 |

4. Adhesive Compositions Comprising the Second Polyurethane and/or Polyurethane-Polyurea Polymer and the Acrylate Polymer Raw Materials:
  I. Dispercoll U 56
  II. PUD 1 (PUD from Baycoll AD 2047)
  III. PAC 1 (prepared according to 3.3.2)

Formulations:

EXAMPLE 1

Dispercoll U 56

EXAMPLE 2

60% PUD 1+40% PAC 1

EXAMPLE 3

70% PUD 1+30% PAC 1

EXAMPLE 4

80% PUD 1+20% PAC 1

Adhesive Layers:
Comparative example: 50 μm of polymer from Example 1=partially crystalline polyurethane and/or polyurethane-polyurea polymer
(Step II):
100 μm of Dispercoll U56 are applied to an aluminium plate (thickness 1.0 mm) using a doctor blade and dried at 70° C. The adhesive layer of the dried polymer has a thickness of 50 μm or 50 g/m2 (assumption: density of the polymer=1 g/ml)

The aluminium plate coated with adhesive polymer is placed on the heating plate (Peltier element), which has been tempered to 70° C., of the texture analyser and the tack of the adhesive layer is determined at 70° C. (Performance of the tack measurement, see above)

The thermostat of the Peltier element of the texture analyser is subsequently adjusted to 23° C.; the adhesive layer on the aluminium plate cools. During the cooling process, the tack of the adhesive polymer is determined at intervals of 60 sec. in each case. The temperature during the tack measurement is also recorded.

Examples According to the Invention:
50 μm of Polymer from Example 1+40 μm of Polymer from Examples 2, 3 and 4 (Examples 6-8)

The aluminium plate coated with adhesive polymer from Example 5 is coated with 100 μm of dispersion from Examples 2, 3 and 4 (Step III). With a polymer proportion of the dispersions of 40%, a thickness of 40 μm or 40 g/m2 results (assumption: density of the polymer=1 g/m2)

The aluminium plate coated with adhesive polymer is placed on the heating plate (Peltier element), which has been tempered to 70° C., of the texture analyser and the tack of the adhesive layer is determined at 70° C. (Performance of the tack measurement, see above)

The thermostat of the Peltier element of the texture analyser is subsequently adjusted to 23° C.; the adhesive layer on the aluminium plate cools. During the cooling process, the tack of the adhesive polymer is determined at intervals of 60 sec. in each case. The temperature during the tack measurement is also recorded.

Measurement Results:

|  | Time | Temperature of the adhesive layer | Tack [N/mm$^2$] |
|---|---|---|---|
| Example 5 | 0 | 70 | 0.456 |
|  | 60 | 41 | 0.424 |
|  | 120 | 29 | 0.434 |
|  | 180 | 23 | 0.494 |
|  | 240 | 24 | 0.564 |
|  | 300 | 25 | 0.635 |
|  | 360 | 25 | 0.314 |
|  | 420 | 25 | 0.273 |
|  | 480 | 25 | 0.266 |
|  | 540 | 25 | 0.214 |
|  | 600 | 25 | 0.009 |

The partially crystalline adhesive polymer only reaches a tack value of <0.05 N/mm2 after 600 sec.

|  | Time | Temperature | Tack |
|---|---|---|---|
| Example 6 | 0 | 70 | 0.445 |
|  | 60 | 42 | 0.426 |
|  | 120 | 30 | 0.206 |
|  | 180 | 25 | 0.176 |
|  | 240 | 25 | 0.184 |
|  | 300 | 25 | 0.049 |

|  | Time | Temperature | Tack |
|---|---|---|---|
| Example 7 | 0 | 70 | 0.331 |
|  | 60 | 42 | 0.268 |
|  | 120 | 30 | 0.252 |
|  | 180 | 25 | 0.128 |
|  | 240 | 25 | 0.001 |

|  | Time | Temperature | Tack |
|---|---|---|---|
| Example 8 | 0 | 70 | 0.0018 |
|  | 60 | 42 | 0.001 |

After just a short time, the partially crystalline polyurethane and/or polyurethane-polyurea polymer coated with a release layer is already no longer adhesive. After application and drying of the release layer, a web-shaped substrate equipped with a partially crystalline adhesive polymer could be rolled up in a block-free manner within a short time.

The invention claimed is:

1. A method for the production of an adhesive-coated article, comprising the steps of:
   (I) providing a substrate;
   (II) applying a first polyurethane and/or polyurethane-polyurea polymer onto the substrate,
      the first polyurethane and/or polyurethane-polyurea polymer being capable of attaining an at least partially crystalline state with a final degree of crystallinity,
      wherein during and/or after the application the first polyurethane and/or polyurethane-polyurea polymer is present in a non-crystalline state;
      wherein the first polyurethane and/or polyurethane-polymer has a melting temperature from ≥42° C. to ≤80° C., a glass transition temperature from ≥−100° C. to ≤−10° C. and a molecular weight $M_w$ from ≥20000 g/mol to ≤80000 g/mol, the glass transition temperature being determined by differential scanning calorimetry according to DIN 65467 at a heating rate of 20 K/min,
   wherein the method further comprises the steps:
   (III) applying onto the first polyurethane and/or polyurethane-polyurea polymer of step (II) a composition comprising a mixture of a second polyurethane and/or polyurethane-polyurea polymer and furthermore an acrylate polymer,
      wherein the application is performed while the degree of crystallinity of the first polyurethane-polyurea polymer is lower than its final degree of crystallinity,
      wherein the second polyurethane and/or polyurethane-polyurea polymer has a glass transition temperature from ≥−50° C. to ≤10° C. and the acrylate polymer has a glass transition temperature of ≥30° C., the glass transition temperatures being determined by differential scanning calorimetry according to DIN 65467 at a heating rate of 20 K/min.; and
   (IV) cooling the article obtained to a temperature below the glass transition temperature of the acrylate polymer.

2. The method according to claim 1, wherein the composition in step (III) is applied via intaglio printing.

3. The method according to claim 1, wherein step (III) is performed ≥0.1 seconds to ≤60 seconds after the end of step (II).

4. The method according to claim 1, wherein in step (IV) the obtained article is cooled to a temperature below the glass transition temperature of the acrylate polymer via a chill roll.

5. The method according to claim 1, wherein the method is conducted as a roll-to-roll process.

6. The method according to claim 1, wherein the composition in step (III) has a thickness of ≥1 µm to ≤50 µm after drying.

7. The method according to claim 1, wherein the first polyurethane and/or polyurethane-polyurea polymer in step (II) is a latent reactive adhesive and furthermore the second polyurethane and/or polyurethane-polyurea polymer and/or the acrylate polymer in step (III) comprise free isocyanate reactive groups.

8. The method according to claim 1, wherein the first polyurethane and/or polyurethane-polyurea polymer in step (II) is obtained by the reaction of:
   (A) at least one diol and/or polyol component,
   (B) at least one di- and/or polyisocyanate component,
   (C) at least one component having sulphonate and/or carboxylate groups,
   (D) mono-, di- and/or tri-amino-functional and/or hydroxyamino-functional compounds, as appropriate, and
   (E) other isocyanate-reactive compounds, as appropriate.

9. The method according to claim 1, wherein the second polyurethane and/or polyurethane-polyurea polymer in step (III) is obtained by the reaction of:
   (A) at least one diol and/or polyol component,
   (B) at least one di- and/or polyisocyanate component,
   (C) at least one component having sulphonate and/or carboxylate groups,
   (D) mono-, di- and/or tri-amino-functional and/or hydroxyamino-functional compounds, as appropriate, and
   (E) other isocyanate-reactive compounds, as appropriate.

10. The method according to claim 1, wherein the acrylate polymer in step (III) is obtained by the reaction of:
    (a) ≥40% to ≤70% by weight of styrene and/or other vinyl aromatic compounds,
    (b) ≥4% to ≤40% by weight of an acrylic ester,
    (c) ≥2% to ≤5% by weight of an acid-functional, olefinically unsaturated monomer and
    (d) ≥10% to ≤40% by weight of a methacrylic ester,
    wherein the total weight proportions of the components a) to d) amount to ≤100% by weight.

11. An article of manufacture, obtained by the method according to claim 1, comprising:
    a substrate;
    a first layer on top of to the substrate,
      the first layer comprising a first polyurethane and/or polyurethane-polyurea polymer which has a melting temperature from ≥42° C. to ≤80° C., a glass transition temperature from ≥−100° C. to ≤−10° C. and a molecular weight $M_w$ from ≥20000 g/mol to ≤80000 g/mol, and
    a second layer on top of to the first layer,
      the second layer comprising a second polyurethane and/or polyurethane-polyurea polymer with a glass transition temperature from ≥−50° C. to ≤10° C. and
      further comprising an acrylate polymer which has a glass transition temperature of ≥30° C.,
    all glass transition temperatures being determined by differential scanning calorimetry according to DIN 65467 at a heating rate of 20 K/min.

12. The article of manufacture according to claim 11, wherein the article does not comprise a release paper or a release film.

13. A method for coating of an object utilizing the article according to claim 11.

* * * * *